UNITED STATES PATENT OFFICE.

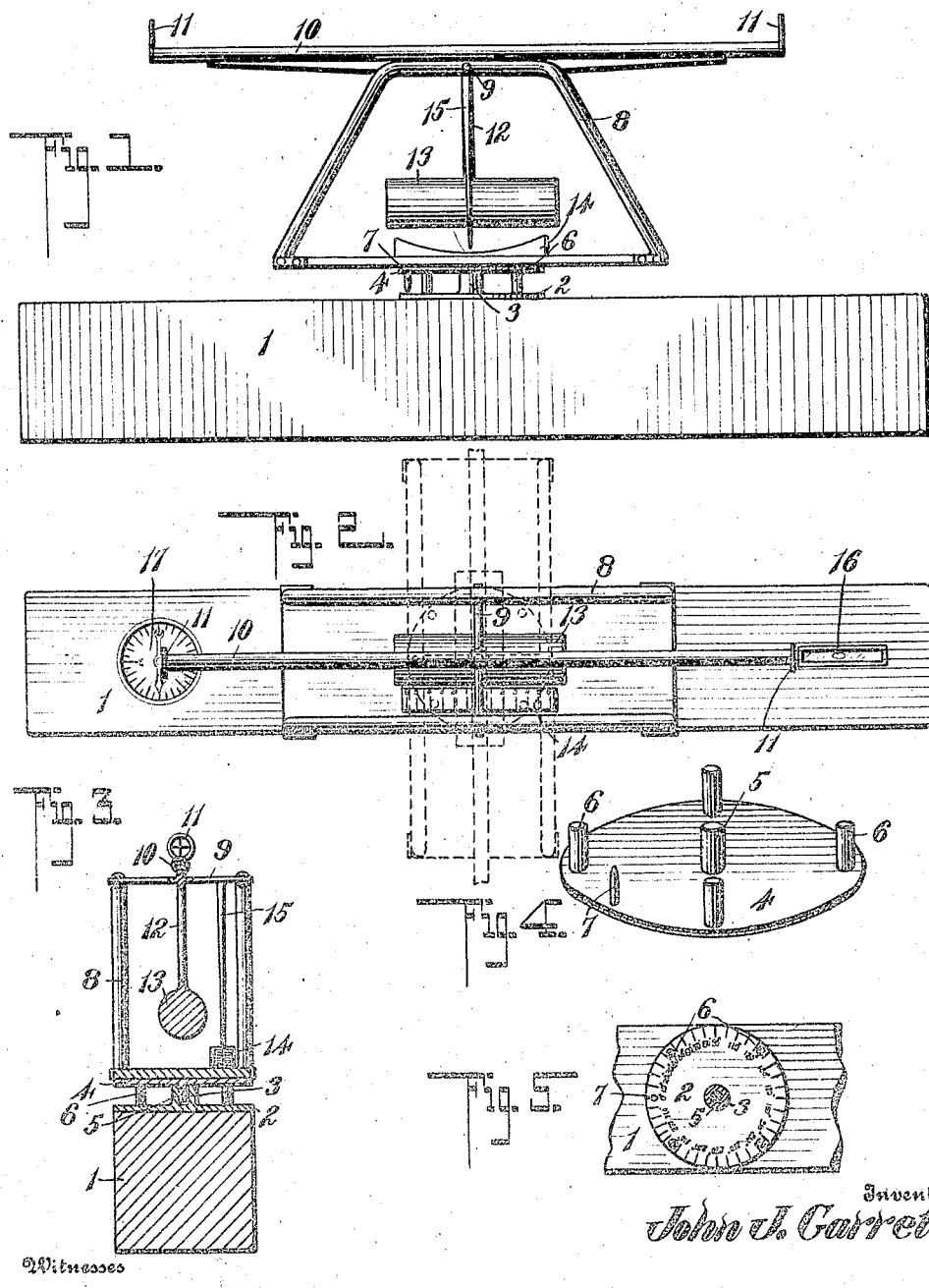

JOHN JOSEPH GARRETT, OF LAKE CITY, ARKANSAS, ASSIGNOR OF ONE-HALF TO J. P. TABER AND JOEL P. TABER, BOTH OF BAY, ARKANSAS.

AUTOMATIC LEVEL.

No. 924,340.  Specification of Letters Patent.  Patented June 8, 1909.

Application filed July 13, 1908. Serial No. 443,198.

*To all whom it may concern:*

Be it known that I, JOHN JOSEPH GARRETT, a citizen of the United States, residing at Lake City, in the county of Craighead and State of Arkansas, have invented a new and useful Improvement in an Automatic Level, of which the following is a specification.

This invention relates to a level designed to automatically register in inches or a fraction thereof the extent to which any wall or other work is out of plumb, and a further object of the invention is to combine with such a leveling device simple means for laying off ditches, locating foundation walls etc.

The invention consists of the novel features of construction hereinafter described, pointed out in the claims and shown in the accompanying drawings, in which:—

Figure 1 is a side elevation of the device. Fig. 2 is a plan view. Fig. 3 is a central cross section. Fig. 4 is an inverted perspective view of a rotatable plate. Fig. 5 is a plan view of a fixed degree plate, certain posts and an indicating pin being shown in cross section.

In these drawings 1 represents the level stock upon the top of which is placed a plate 2 having a degree scale laid off thereon and provided with a central hub portion 3. A disk 4 is centrally provided with a pin 5 which fits loosely in the hub 3 so that the disk 4 can rotate above the fixed plate 2. The disk 4 is provided with depending posts 6 the lower ends of which rest upon the marginal portion of the plate 2, and prevent any rocking or swinging of the disk 4, and also serve to remove lateral strain from the pivot pin 5, thereby avoiding any bending of said pin. The disk 4 also carries an indicating pin 7 which extends downwardly and travels above the degree scale upon the plate 2. The disk 4 also carries two vertically arranged brackets 8 parallel to each other and a shaft 9 is journaled in said brackets. Fixed upon this shaft is a rod 10 which carries suitable sights 11 at its ends. From said shaft and rod depends an arm 12 carrying at its lower end a cylindrical weight 13 arranged midway between and parallel to the brackets 8. The disk 4 also carries adjacent one of said brackets a block 14 arranged parallel to the weight 13 and having an upper concave face, upon which is laid off the scale representing inches and fractions of an inch. A depending pointer 15 is carried by the shaft 9 and swings with said shaft, working upon the scale laid off upon the block 14. The stock 1 is also provided with a spirit level 16 and a compass 17.

When the level 1 is placed upon a wall or other piece of work the top of which is inclined relative to the surface of the earth the swinging of the weight 13 to bring the arm 12 into a perpendicular position will rock the shaft 9 and bring the pointer 15 over that portion of the scale formed upon the block 14 which indicates the extent of inclination of the work upon which the stock is placed with respect to the ground level, and the scale may be so arranged that this will be shown directly. The disk 4 can be rotated with respect to the plate 2, and the number of degrees through which the disk is rotated will be indicated by the depending pin 7, so that the device can be used for laying off ditches, or locating foundation walls, partitions and the like which are to be arranged at certain predetermined angles to each other.

Having thus fully described my invention, what I claim as new and desire to secure by Letters Patent is:—

1. A device of the kind described comprising a fixed plate having a scale thereon, a rotatable disk mounted above and spaced from said plate, a depending indicating pin carried by said disk and traveling above said scale, upright brackets carried by the disk, a shaft journaled in said brackets, a block having a concave face upon which a suitable scale is placed, said block being carried by the disk, a weight supported from said shaft and rigidly connected therewith, and a depending rigid pointer carried by said shaft and working over the concaved block.

2. The combination with a stock, of a rotatable disk mounted thereon, upright, brackets carried by the disk, a shaft journaled in said brackets, a rod carried by the said shaft, a depending arm carried by the shaft, a weight carried by and at right angles to the arm, a block having a concave upper face, said block being carried by the disk and having a scale laid off upon its upper face, and a pointer fixed to the shaft and working over the concave face of the block during oscillation of the shaft.

3. The combination with a stock, of a disk rotatably carried by the upper face of the stock, said disk rotating in a horizontal plane, upright brackets carried by the disk, a shaft mounted in said brackets, a depending arm fixed to said shaft, a weight secured to the said arm at right angles thereto, a scale block carried by said disk and rotating with it, and a depending pointer arm carried by the shaft and swinging lengthwise of said block upon oscillation of the shaft, as and for the purpose set forth.

JOHN JOSEPH GARRETT.

Witnesses:
 JAMES P. TABER,
 JOEL P. TABER.